United States Patent
Goodrich et al.

(10) Patent No.: US 10,526,561 B2
(45) Date of Patent: * Jan. 7, 2020

(54) REMOVAL OF FREE FATTY ACIDS FROM GLYCERIDE OILS

(71) Applicants: Peter Goodrich, Antrim (GB); Eoghain O'Hara, Antrim (GB); Martin P. Atkins, Antrim (GB)

(72) Inventors: Peter Goodrich, Antrim (GB); Eoghain O'Hara, Antrim (GB); Martin P. Atkins, Antrim (GB)

(73) Assignee: THE QUEEN'S UNIVERSITY OF BELFAST, Belfast, Antrim (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/577,112

(22) PCT Filed: May 27, 2016

(86) PCT No.: PCT/GB2016/051565
§ 371 (c)(1),
(2) Date: Nov. 27, 2017

(87) PCT Pub. No.: WO2016/189332
PCT Pub. Date: Dec. 1, 2016

(65) Prior Publication Data
US 2018/0187122 A1 Jul. 5, 2018

(30) Foreign Application Priority Data
May 27, 2015 (GB) .................................. 1509090.5

(51) Int. Cl.
*C11B 3/06* (2006.01)
*A23D 9/04* (2006.01)

(52) U.S. Cl.
CPC . *C11B 3/06* (2013.01); *A23D 9/04* (2013.01)

(58) Field of Classification Search
CPC ... C11B 3/00; C11B 3/001; C11B 3/02; C11B 3/06; C11B 3/10
See application file for complete search history.

(56) References Cited

U.S. PATENT DOCUMENTS 2,771,480 A  11/1956  Chasanov et al.

FOREIGN PATENT DOCUMENTS

| GB | 2523709 | 9/2015 |
|---|---|---|
| WO | 0063327 | 10/2000 |

(Continued)

OTHER PUBLICATIONS

Manic, M. S. et al., Extraction of free fatty acids from soybean oil using ionic liquids or poly(ethyleneglycol)s, 2011, American Institute of Chemical Engineers, vol. 57, No. 5, pp. 1344-1355 (Year: 2011).*

(Continued)

*Primary Examiner* — Yate' K Cutliff
(74) *Attorney, Agent, or Firm* — Ryan T. Grace; Advent, LLP (57) ABSTRACT

The present invention relates to a process for the removal of free fatty acids from glyceride oils, especially palm oil. In particular, the present invention is directed to a process wherein specific ionic liquids are utilised for removing free fatty acids contained in glyceride oils, preferably palm oil, such that a glyceride oil, having a reduced content of free fatty acids may be obtained. The invention also relates to treated glyceride oil compositions, preferably treated palm oil compositions, comprising certain ionic liquids to prevent build-up of free fatty acids in stored oil.

20 Claims, 1 Drawing Sheet

(56) References Cited

FOREIGN PATENT DOCUMENTS

WO      20100136783     12/2010
WO      2015079262     6/2015

OTHER PUBLICATIONS

GB Search Report dated Nov. 27, 2015.
International Search Report dated Jan. 20, 2017.

* cited by examiner

REMOVAL OF FREE FATTY ACIDS FROM GLYCERIDE OILS

The present invention relates to a process for the removal of free fatty acids from glyceride oils, especially palm oil. In particular, the present invention is directed to a process wherein specific ionic liquids are utilised for removing free fatty acids contained in glyceride oils, preferably palm oil, such that a glyceride oil, having a reduced content of free fatty acids may be obtained. The invention also relates to treated glyceride oil compositions, preferably treated palm oil compositions, comprising certain ionic liquids to prevent build-up of free fatty acids in stored oil.

There are a plethora of glyceride oils that may be extracted from natural sources for human or animal consumption, or for other domestic and commercial uses. Such glyceride oils include, for example, vegetable oils, marine oils and animal fats and oils. Typically, it is necessary for glyceride oils to undergo refining before their use, which can vary depending on the particular oil and the associated level and nature of any contamination following extraction.

Palm oil is a vegetable oil derived primarily from the fruit of oil palms and is composed of a number of fatty acids, including palmitic and oleic acids, which are esterified with glycerol. Palm oil has numerous applications and is commonly associated with use in food preparation or as a food additive, whilst it has also found use in cosmetics and cleaning products. Crude palm oil is known to contain vitamin E and is also one of the richest natural plant sources of carotenes, associated with pro-vitamin A activities, and has seen palm oil used as a source of antioxidants.

Palm oil contains a large amount of highly saturated fats, has a high oxidative stability and is naturally low in cholesterol and, partly due to its low cost, is being used increasingly in the food industry as a substitute for trans-unsaturated fats in certain processed food products. As with other glyceride oils, in order to be rendered edible, crude palm oil must undergo a refining process to remove unwanted components. Crude palm oil comprises mono-, di- and tri-glycerides, carotenes, sterols, as well as free fatty acids (FFA), which are not esterified with glycerol to any extent. FFA lead to degradation of the oil and an increase in rancidity and is thus one of a number of components that the refining process seeks to remove from the crude palm oil. Although refining processes may substantially remove FFA from palm oil, long term storage of refined palm oil is known to lead to replenished levels of FFA, as a result of the oxidative and hydrolytic instability of the oil.

In the refining process, crude palm oil typically undergoes a degumming pretreatment with phosphoric acid and/or citric acid to remove impurities and other unwanted substances before being deacidified to remove FFA. Often, refining also includes bleaching (e.g. with bleaching earth) and deodorisation steps before the refined palm oil is considered fit for distribution. The deacidification process is known to have a substantial economic impact on the production of refined palm oil and several different chemical and physical methods for deacidification have been utilized in the past.

Chemical methods include treatment of crude palm oil with alkali such as sodium hydroxide to separate the FFA from the oil. However, it is known that chemical treatment can lead to saponification of glycerides in the oil, increasing the proportion of mono- and di-glycerides, and formation of a soap phase leading to neutral oil (glyceride) losses and reduced output of refined oil. Chemical treatment of vegetables oils with sodium hydroxide is also known to eliminate some of the principal components which are responsible for their oxidative stability.

In Abd El-salam et al., J Food Process Technol, 2011, S5, an alternative deacidification process for a high-free fatty acid olive oil (HFFAO) is proposed which uses a silica gel treatment instead of using sodium hydroxide or calcium hydroxide. There it is reported that the silica gel is effective in neutralising HFFAO and also removing secondary oxidation substances.

Despite the above, physical methods are generally preferred over chemical methods for deacidification of crude palm oil since they are effective at removing FFA whilst avoiding undesirable saponification and emulsification. As a result, physical refining methods also do not suffer from the same yield losses associated with chemical refining, especially in the case of oils with higher contents of FFA. Physical refining is primarily based on chemical free distillation techniques and commonly involves purging saturated steam through an oil at high temperature under vacuum, thereby removing FFA, as well as odoriferous compounds. Although physical refining has a number of advantages over chemical refining, physical methods are known to be energy intensive and heating oil to high temperature under reduced pressure can lead to secondary reactions which can impact upon its physiochemical and organoleptic properties.

Alternative processes that have been proposed include liquid-liquid extraction techniques with polar solvents, operating on the basis of the solubility differences of FFA and neutral oil in order to effect deacidification. In such a process, FFA are separated from neutral oil by selective partitioning into a particular solvent phase. Meirelles et al., Recent Patents on Engineering 2007, 1, 95-102, gives an overview of such approaches to the deacidification of vegetable oils. Biological methods, chemical reesterfication, supercritical fluid extraction and membrane processing are discussed, although there is a particular focus on liquid-liquid extraction methods. The latter technique is generally considered to be advantageous on the basis that it may be performed at room temperature, does not generate waste products and benefits from low neutral oil losses. However, Meirelles et al. observe that there are significant capital costs associated with the implementation of a liquid-liquid extraction process for deacidification, and there remain doubts as to the overall benefits of this process when implemented on an industrial scale. As such, they call for a comparison between the energy requirements for evaporating the solvent as part of its recovery from the refined oil in the liquid-liquid extraction with those associated with operating under high temperature and high vacuum in physical refining methods.

A further issue relates to the stability of glyceride oil, such as palm oil, obtained following the refining process. It is known that there is a propensity for the content of FFA in refined palm oil to increase over time as a result of the oxidative and hydrolytic instability of the oil. The increase in FFA negatively affects the organoleptic qualities of the refined palm oil over time, to the point where it eventually becomes rancid. This lack of storage stability of palm oil has a significant impact upon the market value of palm oil. There are a number of potential treatment options for treating palm oil such that it might be more effectively stored. These include storing in the presence of basic oxides, such as calcium oxide, magnesium oxide and dolomite, or hydrotalcites which neutralise FFA when it is produced. Although, these acid scavengers are useful in preventing FFA levels rising beyond certain thresholds during storage, there is the problem that metal carboxylates are formed as the neutralisation salts which have a high solubility in the oil. This is undesirable as they may negatively impact the organoleptic and/or physiochemical properties of the oil.

There remains a need for a process for deacidification of glyceride oils, such as palm oil, which is capable of producing high value products, whilst avoiding the high energy requirements associated with known processes, particularly those relating to physical refining. There is also a need for a solution to the long term storage problems associated with refined glyceride oils, such as refined palm oil, where FFA content is known to be replenished at least to some extent over a period of time.

The present invention is based on the surprising discovery that specifically selected basic ionic liquids comprising a basic anion can be advantageously utilised for the deacidification of glyceride oils, preferably palm oil, as part of a chemical refining process. The present invention is also based on the surprising discovery that specifically selected basic ionic liquids comprising a basic anion can also be advantageously utilised for improving the storage stability of refined glyceride oils, preferably refined palm oil.

In accordance with a first aspect of the present invention, there is provided a process for removing free fatty acids from glyceride oil, preferably palm oil, containing free fatty acids, said process comprising the steps of:

(i) contacting the glyceride oil containing free fatty acids with the basic ionic liquid; wherein the basic ionic liquid has a basic anion selected from serinate, prolinate, histidinate, threoninate, valinate, asparaginate, taurinate and lysinate; and a cation selected from:

wherein: $R^a$, $R^b$, $R^c$ and $R^d$ are each independently selected from a $C_1$ to $C_8$, straight chain or branched alkyl group or a $C_3$ to $C_6$ cycloalkyl group, or any two of $R^a$, $R^b$, $R^c$ and $R^d$ combine to form an alkylene chain $—(CH_2)_q—$ wherein q is from 3 to 6, wherein said alkyl or cycloalkyl groups are unsubstituted or may be substituted by one to three groups selected from: $C_1$ to $C_4$ alkoxy, $C_2$ to $C_8$ alkoxyalkoxy, $C_3$ to $C_6$ cycloalkyl, —OH, —SH, —$CO_{-2}$ ($C_1$ to $C_6$)alkyl, —OC(O)($C_1$ to $C_6$)alkyl, for example one to three —OH groups; and wherein the basic ionic liquid is in a solid form and is located within a porous container, wherein the container is permeable with respect to the glyceride oil; and (ii) obtaining a treated glyceride oil having a reduced content of free fatty acid compared to the glyceride oil feed of step (i).

The term "ionic liquid" as used herein refers to a liquid that is capable of being produced by melting a salt, and when so produced consists solely of ions. An ionic liquid may be formed from a homogeneous substance comprising one species of cation and one species of anion, or it can be composed of more than one species of cation and/or more than one species of anion. Thus, an ionic liquid may be composed of more than one species of cation and one species of anion. An ionic liquid may further be composed of one species of cation, and one or more species of anion. Still further, an ionic liquid may be composed of more than one species of cation and more than one species of anion.

The term "ionic liquid" includes compounds having both high melting points and compounds having low melting points, e.g. at or below room temperature. For the purposes of the present invention, ionic liquids are used in a solid form and therefore suitably have a melting point of more than 100° C., preferably a melting point of more than 150° C., and more preferably a melting point of more than 200° C.

Ionic liquids are most widely known as solvents, because of their negligible vapour pressure, temperature stability, low flammability and recyclability make them environmentally friendly. Due to the vast number of anion/cation combinations that are available it is possible to fine-tune the physical properties of the ionic liquid (e.g. melting point, density, viscosity, and miscibility with water or organic solvents) to suit the requirements of a particular application. The present invention benefits from the use of certain basic ionic liquids which have physical properties that mean they may be used in solid form under mild conditions of temperature and pressure.

The ionic liquids used in the process of the present invention are based on simple organic ammonium cations that are neither derived from a fatty acid, nor aromatic in nature. Moreover, the ionic liquids used in the process of the present invention incorporate basic anions. These anions are not merely spectator anions selected by virtue of their ability to confer a certain melting point on the resulting ionic liquid. The basicity of the anions forming part of the ionic liquids used in conjunction with the present invention is believed to contribute to their ability to remove free fatty acids from glyceride oils.

Rather than employing ionic liquids in liquid-liquid extraction methods, the process of the present invention makes use of certain specifically selected basic ionic liquids in an acid-base type reaction with free fatty acids (FFA) contained in glyceride oils, such as palm oil, which are employed in solid form. The process of the present invention corresponds to a new form of chemical refining of glyceride oils, such as palm oil, involving reaction of the basic ionic liquid with the FFA, forming a neutralisation salt, comprising the conjugate base of the FAA.

Advantageously, the process of the present invention may be performed under mild conditions of temperature and pressure, especially compared to known prior art processes, and allow for the effective removal of FFA from glyceride oils, such as palm oil, to yield a high quality treated oil. The neutralisation salts deriving from the reaction of the basic ionic liquid and the free fatty acids are ionic liquids themselves. Thus, the process of the present invention involves reaction of a basic ionic liquid with FFA resulting in the in situ formation of a further ionic liquid comprising the conjugate base of the FFA.

The neutralisation salt (ionic liquid comprising the conjugate base of the FAA) formed from the reaction of the basic ionic liquid and the FAA according to the present invention are non-toxic. As such, it is not necessary to undertake any exhaustive processing to completely remove all traces from the treated oil, in order for the oil to be fit for commercial use. This is advantageous in that it can increase the yield of treated glyceride oils, such as treated palm oil, compared with alternative processes where toxic materials are used or formed during deacidification, such that purification of the treated oil is subsequently necessary.

In some embodiments, the neutralisation salts derived from reaction of the basic ionic liquid with FFA are recovered from the glyceride oil. In that case, the basic ionic liquid can be regenerated from the neutralisation salts by means of a regeneration process in order to be recycled to the deacidification stage, if desired.

In some embodiments, the process of the invention may produce high value by-products, which can represent an additional revenue stream to counteract the significant costs of deacidification of glyceride oils, such as palm oil. For example, neutralisation salts of FFA obtained by the process of the present invention may be commercially valuable by-products in themselves. In particular, neutralisation salts of stearic acid are particularly desirable potential by-products of the process of the present invention.

In some embodiments, contacting the glyceride oil with the basic ionic liquid comprises at least partially immersing the porous container in the glyceride oil.

In an embodiment of the present invention, the process further comprises separating neutralisation salts of free fatty acids formed in step (i) and/or any residual basic ionic liquid from the treated glyceride oil by removal of the porous container from the treated glyceride oil.

Locating the ionic liquid within a porous container is particularly advantageous in that the separation of the neutralisation salts of free fatty acids and/or any residual basic ionic liquid may be conducted in a single step by simply removing the porous container from the bulk oil phase. This avoids costly separation procedures such as filtration to remove material suspended throughout the bulk oil phase. The basic ionic liquid may also be advantageously contacted with the glyceride oil by at least partially immersing the porous container in the oil, avoiding any mixing steps which may be required during the addition of loose material.

It will be understood that the basic ionic liquid, and at least in some embodiments the neutralisation salts of free fatty acids that may be formed subsequently, are located in the porous container throughout the process and are not dispersed throughout the bulk oil phase. However, the porosity of the porous container is configured such that the glyceride oil and free fatty acids may flow from the bulk oil phase into the container. The porous container and/or the basic ionic liquid are configured such that all, or substantially all, of the basic ionic liquid and at least in some embodiments the neutralisation salts of free fatty acids that may be formed subsequently, are located in the porous container throughout the process. In this way, they may be easily separated from the treated glyceride oil.

The term "bulk oil phase" used herein refers to the entire volume of glyceride oil not contained within the porous container.

The term "basic" used herein refers to Brønsted bases having the ability to react with (neutralise) acids to form salts. The pH range of bases is from above 7.0 to 14.0 when dissolved or suspended in water.

The term "glyceride oil" used herein refers to an oil or fat which comprises triglycerides as the major component thereof. For example, the triglyceride component may be at least 50 wt. % of the glyceride oil. The glyceride oil may also include mono- and/or di-glycerides. Preferably, the glyceride oil is at least partially obtained from a natural source (for example, a plant, animal or fish/crustacean source) and is also preferably edible. Glyceride oils include vegetable oils, marine oils and animal oils/fats which typically also include phospholipid components in their crude form.

Vegetable oils include all plant, nut and seed oils. Examples of suitable vegetable oils which may be of use in the present invention include: acai oil, almond oil, beech oil, cashew oil, coconut oil, colza oil, corn oil, cottonseed oil, grapefruit seed oil, grape seed oil, hazelnut oil, hemp oil, lemon oil, macadamia oil, mustard oil, olive oil, orange oil, palm oil, peanut oil, pecan oil, pine nut oil, pistachio oil, poppyseed oil, rapeseed oil, rice bran oil, safflower oil, sesame oil, soybean oil, sunflower oil, walnut oil and wheat germ oil. Preferred, vegetable oils are those selected from coconut oil, corn oil, cottonseed oil, groundnut oil, olive oil, palm oil, rapeseed oil, rice bran oil, safflower oil, soybean oil and sunflower oil. Most preferably, the vegetable oil is palm oil.

Suitable marine oils include oils derived from the tissues of oily fish or crustaceans (e.g. krill). Examples of suitable animal oils/fats include pig fat (lard), duck fat, goose fat, tallow oil, and butter.

Free fatty acids which may be present in the glyceride oils according to the present invention include monounsaturated, polyunsaturated and saturated free fatty acids. Examples of unsaturated free fatty acids include: myristoleic acid, palmitoleic acid, sapienic acid, oleic acid, elaidic acid, vaccenic acid, linoleic acid, linoelaidic acid, α-linolenic acid, arachidonic acid, eicosapentaenoic acid, erucic acid and docosahexaenoic acid. Examples of saturated free fatty acids include: caprylic acid, capric acid, undecylic acid, lauric acid, tridecylic acid, myristic acid, palmitic acid, margaric acid, stearic acid, nonadecylic acid, arachidic acid, heneicosylic acid, behenic acid, lignoceric acid and cerotic acid.

Preferably the glyceride oil used in the present invention is a vegetable oil. More preferably, the glyceride oil is a vegetable oil selected from coconut oil, corn oil, cottonseed oil, groundnut oil, olive oil, palm oil, rapeseed oil, rice bran oil, safflower oil, soybean oil and sunflower oil. Most preferably, the vegetable oil is palm oil.

The term "palm oil" used herein includes an oil at least partially derived from a tree of genus *Elaeis*, forming part of the *Arecaceae* genera, and including the species *Elaeis guineensis* (African oil palm) and *Elaeis oleifera* (American oil palm), or hybrids thereof. Most preferably, the glyceride oil used in accordance with the present invention is palm oil. Thus, palm oil may be used in accordance with all aspects and all embodiments of the invention where reference is made to a glyceride oil. Crude palm oil may be derived from the fibrous mesocarp and the kernels of oil palms. Examples of free fatty acids that may be present in crude palm oil include palmitic ($C_{16}$), oleic ($C_{18}$), stearic ($C_{18}$), myristic ($C_{14}$) and linoleic ($C_{18}$) acids. Palm oil may be fractionated to separate palm olein (liquid) and palm stearin (solid) fractions by fractionating methods typically comprising cooling, crystallisation and membrane separation. Re-fractionation of palm oil olein and palm oil stearin can also provide a palm mid fraction which has a high content of di-saturated triglycerides.

The process of the present invention may be used with palm oil which is either crude or refined, provided there is an amount of FFA present to be removed from the oil, or where FFA may later be formed and neutralised in situ, according to some aspects of the invention described herein. The term "crude" used herein in reference to palm oil is intended to mean palm oil which has not undergone refining specifically to remove free fatty acids therefrom, i.e. has not undergone a deacidification step. A crude palm oil is preferably used wherever reference is made herein to palm oil, apart from where reference is specifically made to a treated palm oil in the context of an oil obtained as result of the deacidification process of the invention, or a treated oil which is to have its storage stability improved in accordance with an aspect of the invention described below.

Advantageously, the process of the present invention avoids the traditional pathway leading to the saponification of glycerides, which is a common side reaction when deacidification is conducted with sodium or potassium hydroxide, as in some prior art methods.

In a preferred embodiment of the present invention, the basic anion is selected from serinate, lysinate, prolinate, taurinate, histidinate and threoninate, more preferably from lysinate and histidinate, most preferably the basic anion is lysinate.

Preferably, the cation is selected from:

wherein: $R^a$, $R^b$, $R^c$ and $R^d$ are each independently selected from $C_1$ to $C_8$ alkyl, including $C_1$, $C_2$, $C_4$ and $C_6$ alkyl, wherein one or more of $R^a$, $R^b$, $R^c$ or $R^d$ may optionally be substituted by one to three groups as described above, for example one to three —OH groups.

More preferably, the cation is selected from:

wherein: $R^a$, $R^b$, $R^c$ and $R^d$ are each independently selected from $C_1$ to $C_4$ alkyl, including $C_1$, $C_2$ and $C_4$ alkyl, wherein at least one of $R^a$, $R^b$, $R^c$ or $R^d$ is substituted by a single —OH group.

Most preferably, the cation is choline:

It will be appreciated that in order for glyceride oil, such as palm oil, obtained directly from the process of the invention to be fit for consumption, the basic ionic liquid used for neutralising the FFA, as well as the salt formed from the acid-base reaction, should have little or no toxicity. A basic ionic liquid comprising a choline cation is particularly suitable for use with the process of the present invention. Choline is a water soluble essential nutrient grouped with the B-complex vitamins which is a precursor to acetylcholine, involved in numerous physiological functions. Choline has particularly low toxicity and excellent biodegradability, making it a natural ingredient that is capable of forming an ionic liquid which is particularly useful in the process of the present invention.

Thus, in a preferred embodiment of the present invention, there is provided a non-toxic process for removing free fatty acids from glyceride oil, preferably palm oil, containing free fatty acids, said process comprising the steps of:
(i) contacting the glyceride oil containing free fatty acids with a basic ionic liquid; wherein the basic ionic liquid has a basic anion selected from serinate, prolinate, histidinate, threoninate, valinate, asparaginate, taurinate and lysinate; and a choline cation:

and
wherein the basic ionic liquid is in a solid form and is located within a porous container, wherein the container is permeable with respect to the glyceride oil; and
(ii) obtaining a treated glyceride oil having a reduced content of free fatty acid compared to the glyceride oil feed of step (i).

More preferably, the basic ionic liquid is selected from choline lysinate and choline histidinate. Yet more preferably, the basic ionic liquid is choline lysinate.

Basic ionic liquids comprising a basic anion selected from serinate, prolinate, histidinate, threoninate, valinate, asparaginate, taurinate and lysinate are also particularly suitable in the process of the present invention due to the particularly low toxicity of these amino acid derivatives.

More preferably, the basic anion is selected from serinate, lysinate, prolinate, taurinate, histidinate and threoninate, even more preferably from lysinate and histidinate, and yet more preferably the basic anion is lysinate.

It will be appreciated that, in the above described non-toxic processes, the process may still further comprise a step of separating neutralisation salts of free fatty acids formed in step (i) and/or any residual basic ionic liquid from the treated glyceride oil.

In a particularly preferred embodiment, the process of the present invention comprises contacting glyceride oil, preferably palm oil, comprising stearic acid with a basic ionic liquid as described hereinbefore which comprises a choline cation, preferably wherein the basic ionic liquid is choline lysinate, to form choline stearate (as illustrated in Scheme I below) and to obtain a treated glyceride oil having a reduced content of stearic acid compared to the glyceride oil feed. Preferably, choline stearate is isolated as a high value by-product of the process. As described hereinbefore, the neutralisation salts formed following the reaction of FFA with a basic ionic liquid in accordance with the present invention are themselves ionic liquids comprising the conjugate base of the FAA (as is clear from Scheme I below).

Scheme I

The basic ionic liquid and the glyceride oil may be contacted in a mass ratio of from 1:25, and from 1:50, and also from 1:75.

The basic ionic liquid may be utilised in the process of the present invention in either supported or unsupported form within the porous container. Suitable supports for use in the present invention may be selected from silica, alumina, alumina-silica, carbon, activated carbon, a zeolite, or a resin. Preferably, the support is silica.

Methods for supporting an ionic liquid on a support material are well known in the art, such as for example, in US 2002/0169071, US 2002/0198100 and US 2008/0306319. Typically, the basic ionic liquid may be physisorbed or chemisorbed on the support material, and is preferably physisorbed.

In the processes of the present invention, the basic ionic liquid may be adsorbed onto the support in a basic ionic liquid:support mass ratio of from 10:1 to 1:10, preferably in a basic ionic liquid:support mass ratio of from 1:2 to 2:1.

Preferably, when the basic ionic liquid is provided on a powdered support, the supported basic ionic liquid is provided as an extrudate. Extrudate comprises an agglomeration of particles, that may be larger than those of powdered support material, which is particularly advantageous when a porous container with relatively large pores is used, for example a metal mesh. Use of an extrudate thus avoids supported particulate being dispersed in the bulk oil phase from the porous container.

An impregnated extrudate may be formed by mixing a solution of a basic ionic liquid with a support material particulate, mulling, extruding to form an extrudate before drying and calcining. Alternatively, an extrudate of a support material is directly impregnated, for instance by incipient wetness, before drying and calcining. The latter technique may avoid mulling and extrusion steps by sourcing a commercially available extrudate support material. However, this imposes limitations on the particular shape and size of the resulting impregnated extrudate prepared, which can be disadvantageous. Furthermore, impregnating a preformed extrudate generally affords a less active material when compared to a support particulate which has been impregnated and then extruded. For these reasons, it is often preferred to start from a support material particulate, rather than a preformed extrudate.

Alternatively, the basic ionic liquid may be supported on a polymeric material, preferably on polymeric beads, for example polystyrene or acrylic beads.

It will be understood that the basic ionic liquids of the present invention will be immiscible with the oil. By immiscible with the oil it is meant that the basic ionic liquid is soluble in the treated glyceride oil phase at a concentration of less than 50 ppm, preferably less than 30 ppm, more preferably less than 20 ppm, most preferably, less than 10 ppm, for example, less than 5 ppm. Thus, the solubility of the basic ionic liquid is tailored so that the basic ionic liquid is immiscible with the oil.

In some embodiments, the porous container of the present invention comprises a mesh. The term "mesh" used herein is intended to refer to materials comprising connected strands or fibres having open pores between the fibres through which the glyceride oil and free fatty acids can flow. It will be understood that the supported or unsupported basic ionic liquid and the porous container are configured such that the basic ionic liquid, and therefore the neutralisation salts of the free fatty acids, may not pass though the pores.

According to some embodiments, the mesh may be extruded, expanded, woven, knitted, welded, or may be made by any other suitable method.

In some embodiments, the mesh comprises a membrane of a cellulosic material or a synthetic polymeric material. Preferably the mesh comprises a material such as cellulose acetate, polysulfone, polyvinylidene fluoride, polyethersulfone, polyamide, or polytetrafluoroethylene. Such membranes may be particularly useful for use with supported or unsupported basic ionic liquid materials with small particle sizes as the pores of such materials may be configured to be small, for example less than 100 µm in size.

Alternatively, in some embodiments the mesh may comprise a metallic material. Any suitable metal may be used; preferably the mesh comprises an iron containing material, for example stainless steel.

Suitably, the contacting step (i) of the process of the present invention is carried out at a temperature of less than 80° C., preferably from 25° C. to 65° C., more preferably from 35° C. to 55° C. As will be appreciated, where the glyceride oil is solid at room temperature, higher temperatures are preferable such that the glyceride oil is in a liquid form for contacting in step (i). Suitably, the contacting step (i) is carried out at a pressure of from 0.1 MPa absolute to 10 MPa absolute (1 bar absolute to 100 bar absolute).

In the processes of the present invention, as the ionic liquid is located within a porous container, step (i) may be carried out by at least partially immersing the porous container in the glyceride oil such that the glyceride oil flows into the interior of the porous container and contacts the basic ionic liquid.

It will be understood that in the process of the present invention, it is preferable that the amount of basic ionic liquid employed in the contacting step (i) be at least equivalent in molar terms with the FFA contained in the glyceride oil. The content of FFA in the glyceride oil may therefore be determined prior to treatment with basic ionic liquid using common titration techniques, of which the person of skill in the art is aware. For instance, titration with sodium hydroxide using phenolphthalein indicator may be used to determine the FFA content of glyceride oil.

In the processes of the present invention, where the ionic liquid is located within a porous container, step (ii) may be carried out by removal of the porous container from the bulk oil phase whilst allowing the treated glyceride oil within the container to flow out into the bulk oil phase. It will be understood that any excess basic ionic liquid and/or neutralisation salts of the free fatty acids will remain within the porous container when removed from the bulk oil phase and are thereby separated from the treated glyceride oil. Step (i) followed by step (ii) may be repeated several times, preferably 2 to 6, for example 2 to 4 times, until the level of free fatty acids in the glyceride oil is reduced to an acceptable value. The treated glyceride oil phase having reduced FFA content (product oil stream) which is obtained from step (ii) may be used directly or may be further processed, for example, by fractional distillation.

The process of the present invention may additionally comprise the step of regenerating a basic ionic liquid from the neutralisation salt of the FAA obtained from the acid-base reaction for recycling purposes.

The regeneration process preferably comprises:
(a) contacting the salt of the FFA with an acid which has a lower pKa than the FFA from which the salt of the FFA was formed; and
(b) obtaining a salt product formed in step (a) which does not comprise the conjugate base of the FFA as an anion.

The regeneration process may further comprise the step of:
(c) performing an anion exchange step on the salt product to obtain a basic ionic liquid comprising the desired basic anion.

Preferably, the pKa of the acid is less than 4.25.

Suitable acids for use in the regeneration process are those that meet the pKa requirements above. The acids thus include mineral acids, for example hydrochloric acid and sulphuric acid. The acids also include organic acids, for example carbonic acid.

It will be appreciated that the above process is suitable for both supported and unsupported ionic liquids.

It will also be appreciated that, where it is suitable, the above regeneration may be conducted whilst the salt of the FFA remains within the porous container. Alternatively the salt of the FFA may be removed from the porous container prior to regeneration.

In accordance with the process of the present invention, a treated glyceride oil may be obtained having substantially all of the content of free fatty acid removed therefrom. By "substantially all" it is meant glyceride oil having less than 2 wt. % free fatty acids, preferably less than 1.5 wt. %, more preferably less than 1 wt. %, and most preferably glyceride oil having less than 0.5 wt. % free fatty acids.

In another embodiment of the present invention, there is provided a process for preparing a food-grade treated glyceride oil, preferably a food-grade treated palm oil, from a glyceride oil containing free fatty acids comprising removal of free fatty acids from the glyceride oil by the process described hereinbefore. By "food-grade" it is meant a treated glyceride oil containing less than 2 wt. % of free fatty acids, preferably less than 1.5 wt. %, more preferably less than 1 wt. %, and most preferably a treated glyceride oil containing less than 0.5 wt. % free fatty acids.

In a further aspect, the present invention also provides a process for improving the storage stability of a treated glyceride oil, preferably a treated palm oil, comprising adding to a treated glyceride oil, containing less than 2 wt % free fatty acids, preferably less than 1.5 wt. %, more preferably less than 1 wt. %, and most preferably containing less than 0.5 wt. % free fatty acids, a basic ionic liquid having a basic anion selected from serinate, prolinate, histidinate, threoninate, valinate, asparaginate, taurinate and lysinate and a cation selected from:

wherein: $R^a$, $R^b$, $R^c$ and $R^d$ are each independently selected from a $C_1$ to $C_8$, straight chain or branched alkyl group or a $C_3$ to $C_6$ cycloalkyl group, or any two of $R^a$, $R^b$, $R^c$ and $R^d$ combine to form an alkylene chain —$(CH_2)_q$— wherein q is from 3 to 6, wherein said alkyl or cycloalkyl groups are unsubstituted or may be substituted by one to three groups selected from: $C_1$ to $C_4$ alkoxy, $C_2$ to $C_8$ alkoxyalkoxy, $C_3$ to $C_6$ cycloalkyl, —OH, —SH, —$CO_{-2}(C_1$ to $C_6)$alkyl, —$OC(O)(C_1$ to $C_6)$alkyl, for example one to three —OH groups; and wherein the basic ionic liquid is in a solid form and is located within a porous container, wherein the container is permeable with respect to the glyceride oil.

Preferably, the basic anion is selected from serinate, lysinate, prolinate, taurinate, histidinate and threoninate, more preferably from lysinate and histidinate. Most preferably, the basic anion is lysinate.

Preferably, the cation is selected from:

wherein: $R^a$, $R^b$, $R^c$ and $R^d$ are each independently selected from $C_1$ to $C_8$ alkyl, including $C_1$, $C_2$, $C_4$ and $C_6$ alkyl, wherein one or more of $R^a$, $R^b$, $R^c$ or $R^d$ may optionally be substituted by one to three groups as described above, for example one to three —OH groups.

More preferably, the cation is selected from:

wherein: $R^a$, $R^b$, $R^c$ and $R^d$ are each independently selected from $C_1$ to $C_4$ alkyl, including $C_1$, $C_2$ and $C_4$ alkyl, wherein at least one of $R^a$, $R^b$, $R^c$ or $R^d$ is substituted by a single —OH group.

Most preferably, the cation is choline:

In the context of the present invention, "improving the storage stability" is intended to mean extending the time over which levels of FFA are replenished to the extent that the oil is no longer considered food grade, i.e. wherein the content of FFA is more than 2 wt. %.

In the above further aspect of the invention, the basic ionic liquid component acts as an acid scavenger which neutralises FFA formed in a glyceride oil, preferably in palm oil, over time. Thus, in accordance with the above further aspect of the invention, the basic ionic liquid may be added to treated glyceride oil, preferably treated palm oil, which is intended to be stored temporarily, or is in transit and thereby exposed to conditions such as heat which would normally exacerbate degrading of the oil and lead to increased formation of FFA. The basic ionic liquid component, and/or any neutralisation salts will be separated from the treated glyceride oil before its intended use by removal of the porous container from the bulk oil phase.

It will be understood that the basic ionic liquids used in this further aspect of the present invention will also be immiscible with the oil. By immiscible with the oil it is meant that the basic ionic liquid is soluble in the treated glyceride oil phase at a concentration of less than 50 ppm, preferably less than 30 ppm, more preferably less than 20 ppm, most preferably, less than 10 ppm, for example, less than 5 ppm. Thus, the solubility of the basic ionic liquid is tailored so that the basic ionic liquid is immiscible with the oil.

In a particularly preferred embodiment, the process of improving the storage stability of the oil comprises adding choline lysinate to the treated glyceride oil, preferably palm oil.

It will be appreciated that in the above further aspects of the invention the porous container may be as previously described herein in relation to the other aspects of the invention.

Embodiments of the invention described hereinbefore may be combined with any other compatible embodiments to form further embodiments of the invention.

The present invention will now be illustrated by way of the following examples and with reference to the following figures.

EXAMPLES

General Method for Determination of Acid Value (mg KOH/g of Oil) and FFA (wt. %) Content of Glyceride Oil.

To a beaker containing 60 ml of isopropyl alcohol was added 0.5 mL of phenolphthalein. This mixture was heated until boiling and 0.02M potassium hydroxide in isopropyl alcohol was added until a faint pink colour persisted for approximately 10 s.

To a glass vial was added 0.200 g of the glyceride oil sample which was subsequently dissolved in 50 ml of the above hot isopropyl alcohol solution. The resulting solution was titrated whilst stirring with 0.02M potassium hydroxide solution using a 25 ml burette graduated in 0.1 ml to the end point of the phenolphthalein indicator i.e until the pink colour persisted for at least 30 s.

The Acid Value (mg KOH/g of oil) was subsequently calculated using the formula:

$$56.1 \times N \times V/m$$

where:
56.1 is the Mr of potassium hydroxide;
V is the volume (ml) of potassium hydroxide solution used;
N is the normality of the potassium hydroxide solution; and
m is the mass (g) of the glyceride oil sample.

Once the Acid Value has been determined, the FFA content may be derived. The FFA content for the purposes of the present disclosure is defined as a mass percentage while assuming the FFA to be an equal mixture of palmitic acid (Mr=256 g/mol) and oleic acid (Mr=282 g/mol), giving an average molecular weight of 269 g/mol. Oil with an FFA of 1 wt. % contains 0.01 g of oleic/palmitic acid per 1 g of oil, which amount of oleic/palmitic acid corresponds to 3.171×10$^{-5}$ mol (0.01/269). The amount of KOH required to neutralise this amount of oleic/palmitic acid (i.e. the Acid Value—AV) is calculated to be 2.086 mg of KOH/g of oil (3.171×10$^{-5}$×56.1). Calculation of FFA content (wt. %) therefore has the following formula:

$$\text{Wt. \% FFA} = \text{Acid Value} \times 0.479$$

Removal of FFA from Palm Oil Using Basic Ionic Liquid/Palm Oil Stability Testing Example 1

Samples of a treated palm oil having 0.251 wt. % FFA were taken and stored at different temperatures (60° C. and 90° C.) in a thermostatically controlled oven. Data was collected periodically over 30 a day period. The long term stability of the treated palm oil was tested alone and in the presence of certain additives as indicated below:
1. No additive
2. Water
3. Free base polymer amberlite
4. Molecular sieves (water scavenger)
5. Choline lysinate (Basic ionic liquid and acid scavenger)

Sample 2 above corresponds to a palm oil composition which is saturated with water at 0.174 w/w %. All additives in samples 3 to 5 above were added at a rate of 4 wt % based on the palm oil.

Tables 1 and 2 below show the FFA content (wt. %) of palm oil for samples 1 to 5 held at temperatures of 60° C. and 90° C. respectively for different time intervals.

TABLE 1

Samples stored at 60° C.

| Sample No. | 0 days | 2 days | 5 days | 12 days | 30 days |
|---|---|---|---|---|---|
| 1 | 0.124 | 0.404 | 0.896 | 1.12 | 1.560 |
| 2 | 0.124 | 0.453 | 0.969 | 1.075 | 1.860 |
| 3 | 0.124 | 0.505 | 0.679 | 0.701 | 0.742 |
| 4 | 0.124 | 0.284 | 0.395 | 0.814 | |
| 5 | 0.124 | 0.190 | 0.485 | 0.506 | 0.545 |

TABLE 2

Samples stored at 90° C.

| Sample No. | 0 days | 2 days | 5 days | 12 days | 30 days |
|---|---|---|---|---|---|
| 1 | 0.124 | 0.672 | 0.868 | 1.117 | 2.080 |
| 2 | 0.124 | 0.774 | 1.087 | 2.626 | 4.516 |
| 3 | 0.124 | 0.331 | 0.465 | 0.520 | 0.554 |
| 4 | 0.124 | 0.401 | 0.994 | 1.521 | |
| 5 | 0.124 | 0.351 | 0.313 | 0.390 | 0.413 |

Figure 1:
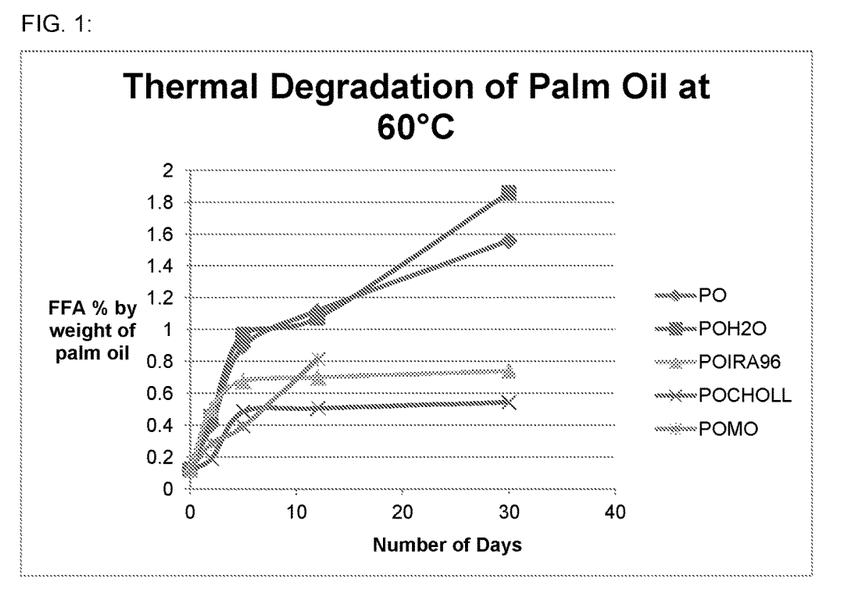
FIG. 1: Graphical representation of thermal degradation of palm oil stored at 60° C. different samples: treated palm oil ("PO"), treated palm oil saturated with water ("$POH_2O$"), treated palm oil containing AMBERLITE (Trade Mark) IRA96 ("IRA96"), treated palm oil containing molecular sieves ("POMO") and treated palm containing choline lysinate ("POCHOLL").
Figure 2:
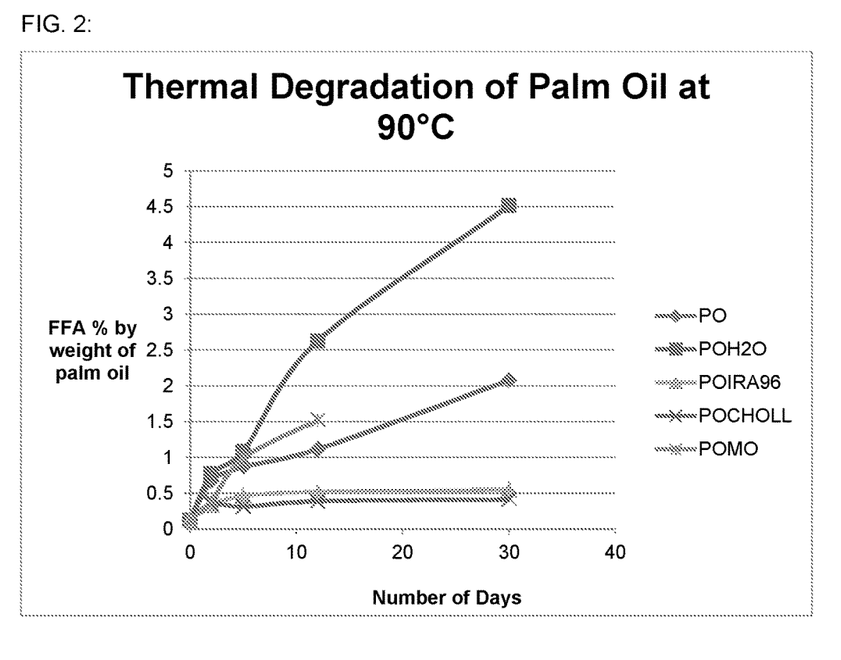
FIG. 2: Graphical representation of thermal degradation of palm oil stored at 90° C. different samples: treated palm oil ("PO"), treated palm oil saturated with water ("POH$_2$O"), treated palm oil containing AMBERLITE (Trade Mark) IRA96 ("IRA96"), treated palm oil containing molecular sieves ("POMO") and treated palm containing choline lysinate ("POCHOLL").

The above results, illustrated graphically in FIGS. 1 and 2, show that significant thermal degradation of the palm oil occurs at both 60° C. and 90° C. for samples 1 and 2, which contain no additive or are saturated with water respectively, as demonstrated by the formation of FFA over time. The combination of water in the palm oil (sample 2) and higher temperature (90° C.) results in significantly increased degradation of the oil, with the content of FFA reaching 4.516 wt. %.

In contrast, sample 5 containing basic ionic liquid (choline lysinate) suppresses oil degradation by neutralising FFA such that the FFA content is maintained well below 1 wt. %. The content of FFA in sample 5 after 30 days at 60° C. is 0.545 wt. % whilst only 0.413 wt. % after 30 days at 90° C. This is improved over the presence of only water scavenging molecular sieves (sample 3), particularly at storage at 90° C. where FFA content increased to 1.5 wt. % after 12 days.

The above experiment was additionally conducted using the basic ionic liquid, choline histidinate. The content of FFA in this sample after 30 days at 90° C. was found to be 0.329 wt. %.

The above examples show that basic ionic liquids are reactive with respect to free fatty acids in glyceride oil. It will therefore be appreciated that the basic ionic liquids discussed herein are effective compounds for the removal of free fatty acids from crude glyceride oil as well as for improving the storage stability of glyceride oils.

The invention claimed is:
1. A process for removing free fatty acids from glyceride oil containing free fatty acids comprising the steps of:
   (i) contacting the glyceride oil containing free fatty acids with a basic ionic liquid; wherein the basic ionic liquid has a basic anion selected from serinate, prolinate, histidinate, threoninate, valinate, asparaginate, taurinate and lysinate; and a cation selected from:

wherein: $R^a$, $R^b$, $R^c$ and $R^d$ are each independently selected from a $C_1$ to $C_8$, straight chain or branched alkyl group or a $C_3$ to $C_6$ cycloalkyl group, or any two of $R^a$, $R^b$, $R^c$ and $R^d$ combine to form an alkylene chain —$(CH_2)_q$— wherein q is from 3 to 6, wherein said alkyl or cycloalkyl groups are unsubstituted or substituted by one to three groups selected from: $C_1$ to $C_4$ alkoxy, $C_2$ to $C_8$ alkoxyalkoxy, $C_3$ to $C_6$ cycloalkyl, —OH, —SH, —$CO_2(C_1$ to $C_6)$alkyl, and —$OC(O)(C_1$ to $C_6)$alkyl; and wherein the basic ionic liquid is in a solid form and is located within a porous container, wherein the container is permeable with respect to the glyceride oil; and

(ii) obtaining a treated glyceride oil having a reduced content of free fatty acid compared to the glyceride oil feed of step (i).

2. A process according to claim 1, wherein contacting the glyceride oil with the basic ionic liquid comprises at least partially immersing the porous container in the glyceride oil.

3. A process according to claim 1, further comprising separating at least one member of a group consisting of: neutralisation salts of free fatty acids formed in step (i) and any residual basic ionic liquid from the treated glyceride oil by removal of the porous container from the treated glyceride oil.

4. A process according to claim 1, wherein the basic anion is selected from serinate, lysinate, prolinate, taurinate, histidinate and threoninate.

5. A process according to claim 1, wherein the cation is selected from:

wherein: $R^a$, $R^b$, $R^c$ and $R^d$ are each independently selected from $C_1$ to $C_8$ alkyl.

6. A process according to claim 5, wherein the cation is choline:

7. A process according to claim 1, wherein the basic ionic liquid is soluble in water or wherein the basic ionic liquid has a melting point of more than 100° C.

8. A process according to claim 1, wherein the basic ionic liquid is choline lysinate or choline histidinate.

9. A process according to claim 1, wherein the basic ionic liquid is adsorbed onto a support in an ionic liquid:support mass ratio of from 10:1 to 1:10.

10. A process according to claim 1, wherein the porous container comprises a mesh.

11. A process according to claim 10, wherein the mesh includes at least one member of a group consisting of: a membrane of a cellulosic material and a synthetic polymeric material.

12. A process according to claim 10, wherein the mesh comprises a metallic material.

13. A process according to claim 1, wherein step (i) is carried out at a temperature from about 25° C. to about 80° C.

14. A process according to claim 1, further comprising regenerating the basic ionic liquid from one or more neutralisation salts of a free fatty acid formed in step (i) and isolated from the treated glyceride oil, by way of a regeneration process.

15. A process according to claim 1, further comprising regenerating a basic ionic liquid as defined in claim 1 from one or more neutralisation salts of a free fatty acid (FFA) formed in step (i) and isolated from the treated glyceride oil, regeneration comprising the steps of:
(a) contacting the salt of the FFA with an acid which has a lower pKa than the FFA from which the salt of the FFA was formed;
(b) obtaining a salt product formed in step (a) which does not comprise a conjugate base of the FFA as an anion; and
(c) performing an anion exchange step on the salt product to obtain a basic ionic liquid comprising the desired basic anion.

16. A process according claim 1, wherein the glyceride oil from step (i) of the process is a vegetable oil.

17. A process for improving the storage stability of a treated glyceride oil comprising adding to a treated glyceride oil containing less than 2 wt. % free fatty acids (FFA), a basic ionic liquid having a basic anion selected from serinate, prolinate, histidinate, threoninate, valinate, asparaginate, taurinate and lysinate; and a cation selected from:

wherein: $R^a$, $R^b$, $R^c$ and $R^d$ are each independently selected from a $C_1$ to $C_8$, straight chain or branched alkyl group or a $C_3$ to $C_6$ cycloalkyl group, or any two of $R^a$, $R^b$, $R^c$ and $R^d$ combine to form an alkylene chain —$(CH_2)_q$— wherein q is from 3 to 6, wherein said alkyl or cycloalkyl groups are unsubstituted or may be substituted by one to three groups selected from: $C_1$ to $C_4$ alkoxy, $C_2$ to $C_8$ alkoxyalkoxy, $C_3$ to $C_6$ cycloalkyl, —OH, —SH, —$CO_2(C_1$ to $C_6)$alkyl, —$OC(O)(C_1$ to $C_6)$alkyl; and wherein the basic ionic liquid is in a solid form and is located within a porous container, wherein the container is permeable with respect to the glyceride oil.

18. A process according to claim 17, wherein the treated glyceride oil contains less than 0.5 wt. % FFA.

19. A process according to claim 17, wherein the basic ionic liquid is choline lysinate or choline histidinate.

20. A process according to claim 17, wherein the treated glyceride oil is a treated vegetable oil.

* * * * *